United States Patent [19]

Jones

[11] 4,126,876
[45] Nov. 21, 1978

[54] SNAPSHOT TYPE THREE DIMENSIONAL CAMERA

[76] Inventor: Harry S. Jones, 50 Navesink Dr., Monmouth Beach, N.J. 07750

[21] Appl. No.: 627,946

[22] Filed: Nov. 3, 1975

Related U.S. Application Data

[63] Continuation-in-part of Ser. No. 389,725, Aug. 20, 1973, abandoned.

[51] Int. Cl.² ............................................. G03B 35/08
[52] U.S. Cl. .................................. 354/112; 350/286
[58] Field of Search ............... 354/111, 112, 114, 115, 354/117, 118; 352/57, 58; 350/286, 299, 301, 130

[56] References Cited

U.S. PATENT DOCUMENTS

| 2,573,242 | 10/1951 | Bonnet ................................. 354/117 |
| 2,602,385 | 7/1952 | Bonnet ................................. 354/112 |
| 3,301,154 | 1/1967 | Stewart et al. ....................... 354/112 |
| 3,521,947 | 7/1970 | Jones ................................... 354/115 |
| 3,535,993 | 10/1970 | Jones ................................... 354/112 |

FOREIGN PATENT DOCUMENTS

296,073   2/1971   U.S.S.R. ................................. 354/115

*Primary Examiner*—L. T. Hix
*Assistant Examiner*—Alan Mathews
*Attorney, Agent, or Firm*—Mandeville and Schweitzer

[57] ABSTRACT

Prior art shows multiple element optical means for image format reversal located between the front and rear elements of the large aperture primary lens of a snapshot type three dimensional (3-D) camera. Described herein are improvements in the prior art image format reversal means and the use of multiple element format reversal means in other positions not shown in the prior art. Also described are 3-D cameras which use new and different type of multiple image format reversal elements having superior characteristics.

5 Claims, 10 Drawing Figures

U.S. Patent  Nov. 21, 1978  4,126,876
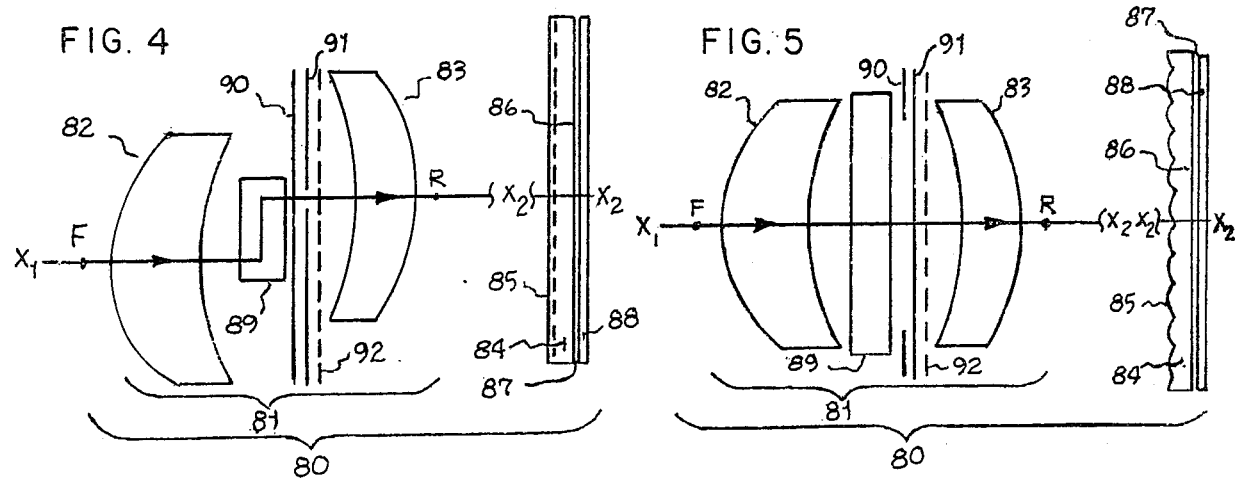
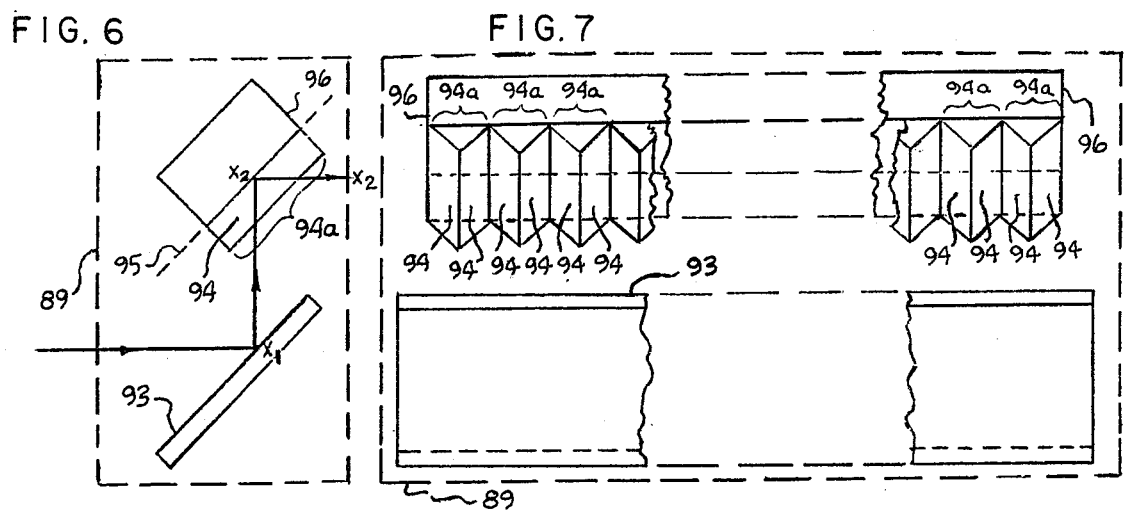
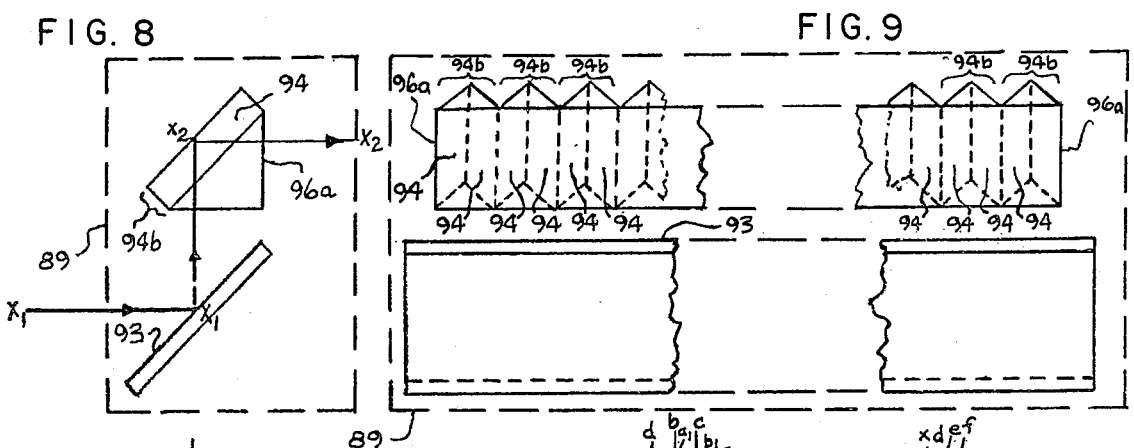
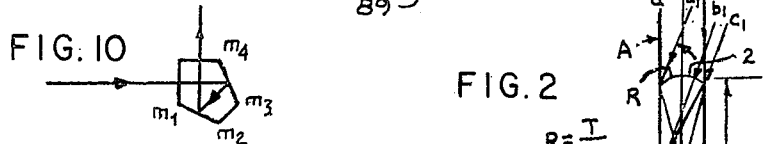
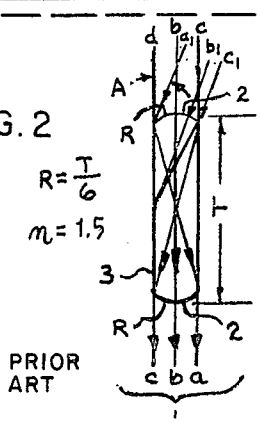
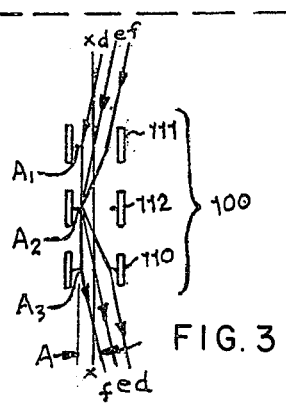
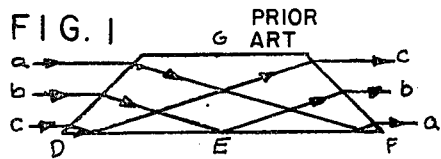

SNAPSHOT TYPE THREE DIMENSIONAL CAMERA

This application is a continuation-in-part of application Ser. No. 389,725 filed Aug. 20, 1973, now abandoned.

BACKGROUND

Ives U.S. Pat. No. 1,882,424 reveals the use of a primary lens of large horizontal aperture in a snapshot type 3-D camera system to photograph objects in abnormal (pseudoscopic) three dimensions (3-D) using one vertically-oriented cylindrical lens plate closely adjacent to the film.

Bonnet U.S. Pat. No. 2,573,242 reveals a snapshot type 3-D camera having means for correction of the above abnormal to normal (stereoscopic) three dimensional (3-D) photographs during picture taking using multiple element means located between the front and rear elements of the primary lens.

Stewart U.S. Pat. No. 3,301,154 and Jones U.S. Pat. Nos. 3,535,993 and 3,564,987 reveal means for correction of abnormal to normal 3-D during picture taking using means located within a region closely adjacent to the film in snapshot type 3-D cameras.

DESCRIPTION OF THE INVENTION

The invention herein described significantly improves upon Bonnet's U.S. Pat. No. 2,573,242 which does not solve the severe vignetting problems of his apparatus when off-axis images on the picture format are photographed. The above-indicated Bonnet patent does not discuss these problems and shows only principal axis rays in all of its Figures, which rays produce only the center point of the picture format.

These vignetting problems are caused by the Dove or Wollaston type prisms shown in FIG. 1 employed by Bonnet, or the type of afocal optical systems shown in FIG. 2 which he uses to obtain format reversal or image inversion about one or two axes. When it is attempted to use the Dove prisms or the afocal components used by Bonnet for practical field angles of about 60° the system suffers greatly from vignetting. Only relatively small total field angles of about 20° are shown in the Figures of U.S. Pat. No. 2,573,242.

The Bonnet patent also fails to recognize that his apparatus may also be used outside the front and rear elements of a primary lens containing at least two lens elements.

The invention herein described covers novel means for substantially reducing or eliminating the vignetting problem not solved by Bonnet, as described below.

Referring to the drawings:

FIG. 1 is a schematic drawing of one Dove prism element of the type used in multiple in systems described by Bonnet in U.S. Pat. No. 2,573,242.

FIG. 2 is a schematic drawing of a spherical or cylindrical optical afocal element of the type described in U.S. Pat. No. 2,573,242.

FIG. 3 is a schematic drawing of an image reversal system according to this invention having a collimating element disposed between two focal elements.

FIG. 4 is an elevation view schematic drawing of a 3-D snapshot type camera system according to this invention including a preferred novel image format reversing means.

FIG. 5 is a plan view schematic drawing of a 3-D snapshot type camera system according to this invention including a preferred novel image format reversing means.

FIGS. 6, 7 are partly fragmentary views, as indicated, of a novel preferred form of image format reversing means which utilize multiple image-reversing mirror elements.

FIGS. 8, 9 are views, as indicated, of an alternate novel preferred form of multiple element image format reversing means. FIG. 10 is a schematic drawing showing an alternate common component for use in the image reversing means shown in FIGS. 6, 7, 8 and 9 which may be used in lieu of the large flat common mirror.

As will become hereinafter apparent, the constructions of concern herein are all directed toward a 3-D camera of the snapshot type that will provide a normal stereoscopic 3-D picture when viewed after processing using a single lenticulated plate having a lenticular surface formed of a multiplicity of individual lens elements disposed closely adjacent to the processed film.

A further object of these constructions is to provide a snapshot 3-D camera that will produce a normal stereoscopic 3-D picture when lenticulated film is used or when one multiple element lens plate is positioned closely adjacent to the picture surface of Polaroid SX-70 film, or any other type film having its processed picture on only the camera lens side.

A further object of this invention is to provide snapshot type 3-D cameras which use new and improved types of image format reversal elements, and which use these image reversal elements in other positions than within a large primary lens having at least two elements.

The specification of U.S. Pat. No. 2,573,242 states that the arrangement described is very simple and does not require any special explanation. However, to assist in the description of the subject invention, the following further explanation is given in the next paragraph below.

If, in the system described in U.S. Pat. No. 2,573,242, only one Dove prism is used there will be no correct or normal stereoscopic 3-D image, i.e., the image will be pseudoscopic when the processed film is viewed through a single cylindrical lens plate adjacent to the film. The only effect of this one Dove prism is an image inversion about a vertical axis. However, if an appropriately large number of Dove prisms are used the same image reversal will occur but the 3-D image will be normal. If only a few Dove prisms are used in the above system a combination of normal and abnormal effects will be observed as the 3-D picture is rotated about a vertical axis during viewing.

In U.S. Pat. No. 2,573,242 all its Figures show a camera having a relatively small total field angle of about 20° and also show only the rays which form a center point of the image format. However, image points at the edges of the format will be darkened due to ray interference in the Dove prisms of the type shown in FIG. 1. The photographic term for this darkening is "vignetting." Because of this vignetting effect the use of glass Dove prisms becomes increasingly impractical when cameras of larger field angles are used. For primary lens angles of 40° to 60° the use of Dove prisms becomes impractical.

U.S. Pat. No. 2,573,242 briefly suggests the use of a multiplicity of two component afocal spherical or cylindrical lenses in lieu of Dove or Wollaston prisms to obtain image format reversal about one or two axes. A typical afocal element of the type specified in U.S. Pat.

No. 2,573,242 is shown in FIG. 2. Each afocal lens 1 comprises two surfaces 2, both usually having the same radius R. The separation of surfaces 2 will be 6R when the refractive index of the lens material is close to 1.5. Surface 3 should, preferably, be totally absorbing, or dull black, for practical purposes.

As shown in FIG. 2, parallel rays $a$, $b$ and $c$ are reversed but parallel after passing through element 1. Unfortunately, off axis parallel rays $a_1$, $b_1$ and $c_1$ cannot pass through lens element 1 but are absorbed or scattered by the sidewall 3 of this lens element. It will be seen that for the off-axis angle A no light exits from lower element 2. For substantially smaller values of angle A some light will, of course, pass through this optical element. It will, therefore, be clear that this prior art type of optical element will cause significant vignetting in a practical camera system.

FIG. 3 shows an improved lenticular image format inverting element 100 comprising three lens systems, 111, 112 and 113 having aperture stops $A_1$, $A_2$ and $A_3$, respectively, all having a common optical axis XX. These lenses may be either spherical or cylindrical as desired. If cylindrical, these cylindrical lenses will be parallel with the cylindrical lenses disposed adjacent to the film. Lenses 111 and 113 are substantially identical and are spaced so that parallel rays $d$, $e$, and $f$ are focused upon aperture $A_2$ of lens 112. Lenses 112 and 113 are also spaced so that diverging rays $d$, $e$ and $f$ are again rendered parallel but in reverse order by lens 113. Lens 112 is about half the focal length of lenses 111 and 113 so that it, in effect, focuses an image of aperture $A_1$ upon aperture $A_3$.

It will be clear that lens 112 serves as a collimator to prevent the light loss that would otherwise occur if lens 112 were omitted. It will also be clear that lenses 111 and 113 here correspond to lenses 2 in FIG. 2 of the prior art system. However, the prior art system shown in FIG. 2 contains no element corresponding to lens 112.

In FIG. 3 lenses 111, 112 and 113 may be as sophisticated as desired in order to provide the required quality of the format image which they invert.

The improvement achieved by the addition of a third lens 112 is a substantial increase in the value of field angle A which may be used without loss of light (without vignetting).

It will be clear to those skilled in the art that the lenses shown schematically in FIG. 3 may be either spherical or cylindrical. When cylindrical, the view shown in FIG. 3 is a section perpendicular to the direction of cylindrical lens orientation.

The field angle of a Dove prism may be improved by utilizing optical materials of high refractive index. This will allow the prism length to be shortened. For a typical 45° Dove prism, FIG. 1, the optimum ratio of length to width DF/GE is approximately 4.2 when the optical material has a refractive index of 1.5. When the refractive index is 2.4 the ratio DF/GE is approximately 2.9 for an optimum 45° Dove prism. This shortening of the prism length DF makes possible the use of larger field angles for tolerable amounts of vignetting. Some optical materials of substantially higher refractive index ($n$) than glass are:

Yttrium Aluminum Garnet ... $n = 1.86$
Strontium Titanate ... $n = 2.4$
Diamond ... $n = 2.4$ FIGS. 4 and 5 show an improved snapshot type 3-D camera 80 wherein the multiple element image format reversal means 89 needed to produce a true stereographic picture may be located either close to the primary lens system or within the primary lens system as shown. Unlike the camera described in U.S. Pat. No. 2,573,242, this camera is focused from closest to infinity by varying the distance between the primary lens and the photosensitive surface, as in most conventional cameras. Reversal device 89 shown in FIGS. 6 and 8 utilizes novel means for obtaining a true stereographic picture. The primary camera lens system 81 comprises at least two elements 82 and 83, wherein a front lens element 82 faces the subject to be photographed and a rear element 83 faces a remote lenticular plate 84 having a lenticular surface 85 formed of a multiplicity of essentially coplanar cylindrical lens elements. A base 88 carries a photosensitive surface 87 positioned close to the rear flat surface 86 of lenticulated plate 84. When desired, surfaces 86 and 87 may be in close interfacial contact. In either case cylindrical elements 85 form an image of the format reversing elements of 89 upon photosensitive surface 87. When desired, lenticulations equivalent to 85 may be formed upon the base of a lenticulated film and the photosensitive surface applied to the flat side of the base of the film equivalent to 86. When desired, the new Polaroid SX-70 film, or other similar rapid access film, may be substituted for conventional film having a photosensitive surface 87 on a base 88. If the transparent window of SX-70 film is suitably lenticulated, such lenticulated film may be used in lieu of lenticulated plate 84, base 88 and photosensitive surface 87.

Due to the use of common flat mirror 93 in reversal means 89 shown in FIGS. 6 and 8, it is necessary that the optical axis $X_1X_1$ of lens 82 be displaced upward or downward in a vertical plane from the optical axis $X_2X_2$ of lens 83 as shown in FIG. 4. Preferably, lens 82 and 83 should be paraxial.

As shown in FIG. 5, a horizontal aperture stop 90 is provided close to reversal means 89. Preferably, the width of stop 90 is varied in direct proportion to the variable focal distance between reversal means 89 and lenticular surface 85.

As shown in FIG. 4, a vertical aperture stop 91 is also provided close to reversal means 89 to prevent unwanted light from by-passing reversal means 89 and activating photosensitive surface 87. When desired, the vertical height of stop 91 may be varied to control exposure and background sharpness.

As shown in FIGS. 4 and 5, any suitable shutter may be provided and disposed in plane 92.

The shutter plane 92 should, preferably, be located in a suitable location within lens 81. However, when desired, reversal means 89, stops 90 and 91 and shutter 92 may be located in a position R between lens 83 and lenticular plate 84 and close to lens 83, or may be located in a position F close to lens 82 away from lenticular plate 84. Reversal means 89, or any other reversal means having an equivalent function, may be located in positions F or R, or within primary lens 81, provided that the field angle of the reversal means is large enough to accomodate the field angles of lens 81 and the lens elements of lenticular surface 85.

Lens 81 should, preferably, have at least two elements to provide good image quality but may have any number of elements desired. The term "within primary lens 81" is intended to mean between any of the lens elements where space permits when two or more lens elements comprise lens 81.

When reversal means other than reversal means 89 are used that do not require displacement of axes $X_1X_1$ and $X_2X_2$ the axes of lens elements 82 and 83 will, of course, be coaxial. Image format reversal means using improved high refraction Dove elements similar to FIG. 1 and the improved lens systems elements shown in FIG. 3 are examples of reversal systems which will allow lenses 82 and 83 to be coaxial when these systems are disposed within primary lens 81, or when used externally.

When reversal means 89 are disposed in position R, lens axes $X_1X_1$ and $X_2X_2$ must be coaxial and elements 84, 85, 86 87 and 88 must be displaced paraxially upward or downward as desired by an appropriate amount. Similarly, when reversal means 89 are disposed in position F, lens elements 82 and 83 must be coaxial and the extension of axis $X_1X_1$ must be displaced paraxially upward or downward as desired an appropriate amount to accommodate reversal means 89.

FIGS. 6 and 8 show multiple element image format reversal means 89 in detail. Referring to the FIGS. 4, 5, 6 and 8, incoming rays from the subject to be photographed are reflected through 90° by a common long flat mirror 93 to an array formed of a multiplicity of flat mirror elements 94 each disposed at 90° to each adjacent mirror element 94. The plane 95 containing the intersections of these adjacent mirror elements 94 is disposed at 45° to the axes of lens elements 82 and 83. In practice, these mirror 94 pairs may be formed using adjacent pairs of 90° prism elements 94a, each having equal 45° base angles as shown in FIG. 7. Plane 95 is also parallel with the plane of common mirror 93. The combination of the array of flat mirror 94 pairs and common mirror 93 will displace the incoming rays in vertical planes paraxially into planes parallel with axis $X_2X_2$. However, incoming rays having a horizontal angular component will be reflected from adjacent internal mirror 94 pairs, as in a roof or Amici prism, so that the image format from left to right is inverted about a vertical axis by each mirror 94 pair. Since all mirror element 94 internally adjacent pairs have a common plane of intersection 95, this array of flat mirror pairs will reverse the entire image formed by primary lens 81 coherently about a vertical axis as would a single larger roof prism if similarly placed. However, unlike a single large roof prism, the sequence of views from left to right through lens 81 is not reversed by the overall system 89. Therefore, the resulting 3-D picture obtained will be stereoscopic rather than pseudoscopic, as when reversal means 89 is removed from the system and lenses 82 and 83 are made coaxial. It will be clear that the passage of light rays through reversal means 89 may be in either direction desired, that is, either exiting or entering rays may pass through common mirror 93, or its common equivalent.

From a structural standpoint it will be clear that the mirror elements 94 may be formed on a common bar 96 of suitable rigid, stable material such as glass, sapphire, rutile or quartz with the surfaces of mirrors 94 reflectively coated. Individual roof-shaped elements 94-a might also be cemented to the common bar 96. This bar 96 and mirror 93 may be held in their specified positions within the camera body by any suitable means relative to the other essential components.

When desired, the array of multiple mirror elements 94-a may be replaced by a multiple array of roof (Amici) prism type elements, as shown in FIGS. 8 and 9. These roof elements 94-b may be cemented or formed upon one rigid common bar of optical material 96-a shaped like a 90° reflection prism in cross section, as shown in FIG. 8. Roof mirror elements 94-a and 94-b will be substantially identical and similar to conventional 90° prisms. In FIGS. 6 and 7 adjacent elements 94-a provide the inside mirror 94 pairs whereas in FIGS. 8 and 9 each roof element 94-b carries a 90° intersecting 94 mirror pair which causes image format reversal. It is important to note that the essence of the superiority of these two similar constructions is that the common bar of glass 96-a or open air makes possible field angles much wider than could be used if a row of separate coventional roof prisms, each having its own side wall, were used. The use of prism shaped common support bar 96-a rather than a rectangular support bar 96 such as shown in the non-refractive air version shown in FIGS. 6 and 7 prevents a spurious unreversed image from being reflected upon plate 84 and also reduces Fresnel reflection losses to a minimum.

The aperture efficiency of each elemental mirror 94 pair in the roof of the reversal means shown in FIGS. 6 and 8 may be designated as A which is the ratio of the width $a$ of each inverted ray bundle to the full width $b$ of the elemental mirror pair. It is important to note that A designates that it is the aperture efficiency only at a total field angle F and is not an average value from $-F/2$ through 0 to $+F/2$. A can be expressed as a simple function of the total-field angle F as follows:

$$A = a/b = \sqrt{2} \sin(45° - F/2)$$

In the refractive form of this reversal means, as shown in FIGS. 8 and 9, the total field angle F is increased to a higher total value $F_n$ as given by the following equation:

$$F_n = 2 \sin^{-1}(n \sin F/2)$$

where $n$ is the refractive index of the roof prism and support bar material.

The comparable aperture efficiencies of prior art Dove prisms are more complicated to compute and have, therefore, been determined by accurate ray-tracing layouts using optimum 45° dove prisms wherein the central axial enterng ray and its emergent path are coaxial and wherein the refractive surfaces of these Doves are displaced at 45° to these coaxial rays.

The table below presents values of aperture efficiency and total field angles determined for Dove prisms and for the new multiple mirror element image reversal means described above. The figures given for A in this table were computed with allowance for the Fresnel losses of refractive materials, for mirror reflection losses and for the loss of light caused by shadowing by the adjacent element in a closely-abutting row of Dove prisms.

| Image reversal means | Aperture Efficiency A. | Total Field Angle F |
|---|---|---|
| Glass Dove Prism | 24.3% | 40° |
| n = 1.5 | 0.1% | 60° |
| SrTio$_3$ Dove Prism | 35.8% | 40° |
| n = 2.4 | 18.3% | 60° |
| Multiple Roof Mirrors | | |
| n - 1.0 (air) | 53.8% | 40° |
| Figures 6 and 7 | 32.8% | 60° |
| | 24.6% | 70° |
| Multiple Roof Prisms | | |
| n = 1.5 (glass) | 48.3% | 61.8° |
| Figures 8 and 9 | 32.8% | 97.2° |
| Multiple Roof Prism | | |

| Image reversal means | Aperture Efficiency A. | Total Field Angle F |
|---|---|---|
| n = 2.4 (SrTiO₃) Figures 38 and 38-A | 34.3% | 110.2° |

From the above table it will be clear that the roof mirror and prism reversal means have substantially higher aperture efficiencies than Dove prisms for total field angles of 40° or larger. This table also shows that when large total field angles (60° to 100°) are required the aperture efficiencies of Dove prisms are significantly lower than those of roof system. In most practical systems total field angles of reversal elements must be at least 60° to minimize light loss and vignetting.

When desired, a common 90° reflection prism (not shown) may be substituted for common mirror 93.

When desired, common mirror 93 may be omitted and the rays from mirror elements 94 may be allowed to fall directly upon the recording components 84, 85, 86, 87 and 88. However, this requires repositioning components 84, 85, 86, 87 and 88 so that their surfaces are parallel with optical axis $X_2X_2$ and positioning reversal means 89 in position R. Similarly, this system with mirror 93 omitted may be placed in position F if the subject to be photographed is viewed 90° from axis $X_1X_1$.

When desired, a common penta-prism or an equivalent common "penta-mirror" system $m_1m_2/m_3m_4$ may be substituted for mirror 93, as shown on FIG. 10.

When desired, a common pair of flat mirrors (not shown) mutually disposed at 90°, as in the smaller 94 mirror pairs described above with their plane of intersection coincident with the plane or mirror 93 may be substituted for mirror 93.

I claim:

1. In a camera construction for taking stereoscopic pictures and of the type comprising
   (a) a primary lens system,
   (b) lenticulated plate means disposed remote from said primary lens system and having associated therewith a photosensitive surface, and
   (c) a multielement image format reversal system disposed in close proximity to said primary lens system,
   (d) said lenticular plate means and said multielement image format reversal system being arranged on the optical path of said primary lens system, the improvement in said image format reversal system comprising,
   (e) an array of a plurality of internally reflecting image reversal prisms mounted side-by-side in closely adjacent relation,
   (f) said image reversal prisms having two intersecting internally reflecting surfaces, and a third surface accommodating entry and exit of light rays,
   (g) the lines of intersection of the intersecting surfaces of said image reversal prisms, and the third surface of said prism, being substantially parallel,
   (h) the respective third surfaces of said image reversal prisms being coplanar,
   (i) a larger, common prism, formed with a hypotenuse surface and being mounted with said hypotenuse surface mounted in interfacial relation with the said third surfaces of the plurality of said image reversal prisms.

2. The improvement of claim 1, further characterized by
   (a) said image reversal prisms being formed of a material having a refractive index not substantially less than 1.5.

3. The improvement of claim 1, further characterized by
   (a) the internally reflecting surfaces of said image reversal prisms being substantially flat and disposed at right angles.

4. The improvement of claim 1, further characterized by
   (a) said primary lens system having two or more lens elements, and
   (b) said multielement image reversal system being positioned between any two of said lens elements.

5. The improvement of claim 1, further characterized by
   (a) an additional common image reversal means being provided for cooperative association with said multielement image reversal system, and
   (b) said common image reversal means being operative to effect image reversal on a first axis oriented substantially at 90° to the axis of image reversal of said plurality of image reversal prisms.

* * * * *